(12) United States Patent
Bakthavachalu et al.

(10) Patent No.: US 9,525,787 B2
(45) Date of Patent: Dec. 20, 2016

(54) SYSTEMS AND METHODS FOR IMPLEMENTING PRINT JOB REDIRECTION USING HOTSPOTS TAGS AND MOBILE DEVICES FOR PRINTING IN IMAGE FORMING DEVICES

(71) Applicant: XEROX Corporation, Norwalk, CT (US)

(72) Inventors: Arun Bakthavachalu, Webster, NY (US); Gavan Tredoux, Penfield, NY (US); Peter Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 74 days.

(21) Appl. No.: 14/162,005

(22) Filed: Jan. 23, 2014

(65) Prior Publication Data

US 2015/0207942 A1 Jul. 23, 2015

(51) Int. Cl.
*G06F 15/00* (2006.01)
*H04N 1/00* (2006.01)
*H04N 1/32* (2006.01)

(52) U.S. Cl.
CPC ...... *H04N 1/00307* (2013.01); *H04N 1/32545* (2013.01); *H04N 2201/006* (2013.01); *H04N 2201/0075* (2013.01); *H04N 2201/0094* (2013.01); *H04N 2201/3212* (2013.01); *H04N 2201/3269* (2013.01)

(58) Field of Classification Search
None
See application file for complete search history.

(56) References Cited

U.S. PATENT DOCUMENTS

| 8,339,635 | B2 | 12/2012 | Patwardhan et al. | |
|---|---|---|---|---|
| 2009/0174895 | A1* | 7/2009 | Huster | 358/1.15 |
| 2011/0310428 | A1* | 12/2011 | Ciriza et al. | 358/1.15 |
| 2012/0062912 | A1* | 3/2012 | St. Jacques et al. | 358/1.9 |
| 2013/0169989 | A1* | 7/2013 | Oki | 358/1.14 |

FOREIGN PATENT DOCUMENTS

EP 0996055 A2 4/2000

* cited by examiner

*Primary Examiner* — Helen Q Zong
(74) *Attorney, Agent, or Firm* — Ronald E. Prass, Jr.; Prass LLP (57) ABSTRACT

A system and method are provided for implementing a streamlined scheme for transferring print jobs directly from the print queue of one image forming device to the print queue of another image forming device using mobile devices and tags, such as near field communication (NFC) tags, affixed to image forming devices. A user manipulated mobile device is employed to read a readable tag affixed to or nearby a particular image forming device as a source device in which a print job is stuck, the mobile device running a print-job transfer application. The user then walks up to a different (or destination) image forming device and "touch" its tag, and confirm, for example, when prompted, to transfer the "stuck" print job from the source to the destination image forming system or device.

24 Claims, 4 Drawing Sheets

SYSTEMS AND METHODS FOR IMPLEMENTING PRINT JOB REDIRECTION USING HOTSPOTS TAGS AND MOBILE DEVICES FOR PRINTING IN IMAGE FORMING DEVICES

BACKGROUND

1. Field of Disclosed Subject Matter

This disclosure relates to systems and methods for implementing a streamlined scheme for transferring print jobs directly from the print queue of one image forming device to the print queue of another image forming device using mobile devices and tags, such as near field communication (NFC) tags, affixed to image forming devices.

2. Related Art

Modern office and other production workspace environments make beneficial use of myriad electronic devices in direct and networked communication with each other. These connected electronic devices streamline communications between individuals in the organization and facilitate accomplishment of production tasks by the organization. Individual user workstations, accessible by one or more users, are employed to effect user interaction with the production devices. Outputs from individual user workstations may include point-to-point interactive communications, digital data outputs (raw and/or analyzed) often stored for further analysis or other uses, operating instructions for one or more production devices and other like outputs.

The proliferation of electronic devices places increased physical burdens on a user organization particularly with regard to providing optimum placement of image forming devices in proximity to user workstations to the convenience of individual users. While the problem may be minimal in an instance where the image forming device is a reasonably small desktop device, certain printing and print processing requirements often require ever more sophisticated image forming systems. Complex image forming systems often comprise a number of image forming and finishing modules for individual page image forming and sophisticated document binding and finishing processes carried out through these systems. Optimal placement of the more sophisticated image forming systems may require them to be placed, for example, in a centrally located document processing center within the operating environment of the user organization. Such a document processing center may be located remotely from a large percentage of the user workstations that direct image forming operations in the more complex image forming systems located there. Additionally, there has arisen an increased proliferation in directing printing in all manner of image forming systems, from simple to complex, directly from individual users' mobile devices.

SUMMARY OF THE DISCLOSED EMBODIMENTS

Even as image forming devices have become more sophisticated, and therefore capable, there often still occur instances in which, for myriad reasons, image forming operations that may be directed to a particular image forming device are not carried out as directed. With a recognition that such conditions, particularly with respect to remotely-placed image forming devices may frustrate a particular user, or group of users, leading to customer dissatisfaction, feedback systems are often provided such that a user is alerted, at his or her user workstation, to the failure of the image forming device to complete a particular print job.

Given the increasing pace of task accomplishment in many user organizations, there is a population of users who may send the task (print job) to a particular remote image forming device and immediately make their way to the remote image forming device to recover their print job only to find out then, when they are at a distance from their own workstation, that their print request has failed.

Currently then, any conventional mechanism to intimate the user regarding whether a print job has been accomplished by a particular image forming device does not cover all contingencies required by a modern office workspace environment. In the scenario described above, once the print job has been pushed to the print queue of a particular image forming device, and the user goes to the image forming device to collect the results of the print request (output documents), the user may find that, due to physical or other conditions beyond the user's control, execution of the print job has failed. If the print job fails due to problems, including but not limited to, a paper jam or an out of paper or toner condition in the selected target image forming device, the print job may be stuck in the print queue of that device. In instances where the failure mode of the image forming device has been in place for some extended period of time, or in other instances in which the failure mode of the image forming device is not a condition that the user may be qualified to clear, the user may be forced to return to his or her workstation to redirect the print job separately to an alternate target image forming device.

In an attempt to maintain customer satisfaction with a particular installation of multiple complex image forming systems and/or devices, device and system manufacturers and/or suppliers work diligently to provide scenario-driven "fixes" for situations such as the above, when they are detected. A difficulty with most of these fixes that, while they may, in certain cases, detect a failure mode of a selected target image forming device, and may attempt to redirect a particular user's print job to a non-failed image forming device, the redirected target image forming device may not include a particular capability to complete the print job in the manner desired by the user. Additionally, there are some cases in which reproducing the original print job may be problematic because the original print source may no longer be valid or available for a second attempt based on one or more circumstances.

In view of the above, it may be beneficial to provide a system and a method by which a user, at a particular image forming device, may be afforded an opportunity to "transfer" a particular print job from a selected original target image forming device to an alternate target image forming device.

Exemplary embodiments of the systems and methods according to this disclosure may take specific advantage of available technologies to combine applications available in mobile devices with readable tags, such as near field communication (NFC) tags, affixed to devices, to provide a simple and convenient method for transferring one or more print jobs from a first selected target image forming device print queue to an alternate target image forming device print queue once in proximity to each of the first selected target device and the alternate target device.

Exemplary embodiments may read a readable tag affixed to or nearby a particular image forming device (including a multi-function device (MFD)), the tag containing information identifying the image forming device. This tag-readable information may include, but not be limited to, a device serial number or specified network address. The tag-readable information may further include information regarding capabilities and/or a configuration of the particular image forming device to which the tags are attached.

According to exemplary embodiments, a user may "touch," or otherwise read, the readable tag on the selected original target (or source) image forming device in which the print job is stuck, using a mobile device running a print job transfer application. The user may then walk up to an alternate target (or destination) image forming device and "touch" its tag, and confirm, for example, when prompted, to transfer the "stuck" print job from the source to the destination image forming device.

In exemplary embodiments, the mobile device employed to facilitate transfer of a stuck print job may also read the device capabilities of the alternate target image forming device from the tag. The print job transfer application hosted on the mobile device may then instruct the selected original target image forming device with the stuck print job to transfer the print job directly to the alternate target image forming device with no need for the mobile device to read, or otherwise gain access to, information on the print job in the print queue of the selected original target image forming device.

In exemplary embodiments, and alternatively, the mobile device may read an entire print job including the image data to be printed, and the command information regarding printing of the image data from the selected original target image forming device. The mobile device may then provide the communication link by which to send the print job information to the alternate target image forming device. In this exemplary embodiment, those of skill in the art will understand that the selected original target image forming device, and the alternate target image forming device must each be capable of supporting operations whereby print job information may be extracted from the selected original target image forming device by the mobile device and input to the alternate target image forming device.

In exemplary embodiments, image forming device model and configuration information read from the selected original target image forming device tag may be used to attempt to ensure that the alternate target image forming device is capable of producing the print job in the manner desired by the user. This capability may aid the user in selection of the alternate target image forming device in order to attempt to avoid a situation in which a user may attempt to transfer a particular print job between incompatible image forming devices that are incapable of executing the requested print job to the user's satisfaction.

In exemplary embodiments, when a situation arises in which a selected original target image forming device and a first-selected alternate target image forming device are incompatible, a user may be given an option to bypass image forming and finishing options (or operations) that may be unsupported by the first-selected alternate target image forming device. This option may support situations in which a particular user insists on transferring the print job to the first-selected alternate target image forming device even as that device may represent a less capable destination device.

In exemplary embodiments, when a situation arises in which a selected original target image forming device and a first-selected alternate target image forming device are incompatible, a user may be given an option to select a second or subsequent alternate target image forming device. This option may support situations in which a particular user insists on ensuring that the print job is completed by an ultimately-selected alternate target image forming device in the manner originally instructed by the user.

In exemplary embodiments, a communicating device for directing image forming operations in image forming devices includes a reader portion, a user interface, a processor and a display portion. The reader portion reads identifying information for a first image forming device in a physical proximity of the first image forming device and for a second image forming device in a physical proximity of the second image forming device. The user interface accepts user inputs. The processor is programmed with a print-job transfer application to direct transfer of an image forming operation from the first image forming device to the second image forming device for completion in response to a user input when in a physical proximity of at least one of the first image forming device and the second image forming device. The display portion displays information on image forming operations eligible to be transferred from the first image forming device to the second image forming device. In exemplary embodiments the reader portion is configured to read identifying information for the at least one of the first image forming device and the second image forming device from a hotspot, the hotspot being a powered near field communication device located within the at least one of the first image forming device and the second image forming device. In exemplary embodiments the reader portion is configured to read identifying information for the at least one of the first image forming device and the second image forming device from one of (1) a machine-readable electronic tag comprising at least one of a near field communication device and a radio frequency identification device, and (2) a machine-readable visual tag printed with at least one of a barcode and a glyph. In exemplary embodiments the reader portion reads capabilities information for the second image forming device in a physical proximity of the second image forming device.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing a streamlined scheme for transferring print jobs directly from the print queue of one image forming device to the print queue of another image forming device using mobile devices and tags affixed to image forming devices, when the user requesting the print jobs in close proximity to each of the one image forming device and the another image forming device will be described, in detail, with reference to the following drawings, in which.

DETAILED DESCRIPTION OF THE DISCLOSED EMBODIMENTS

The systems and methods for implementing a streamlined scheme for transferring print jobs directly from the print queue of one image forming device to the print queue of another image forming device using mobile devices and tags affixed to image forming devices, when the user requesting the print jobs in close proximity to each of the one image forming device and the another image forming device as are described in this disclosure will generally refer to this specific utility or function for those systems and methods. Exemplary embodiments described and depicted in this disclosure should not be interpreted as being specifically limited to any particular configuration of the described elements, or to direct or network communication between those elements, or as being specifically limited to any particular intended use. Any advantageous combination of the disclosed concepts for determining that a particular image forming device is in a failed condition precluding execution of a commanded print job and for employing a user's mobile device to transfer the commanded print job from the print queue of one image forming device to the print queue of a second image forming device is contemplated as being included in this disclosure.

Specific reference to, for example, image forming systems or image forming devices as those terms are commonly used throughout this disclosure is intended to make non-limiting reference to common simple, and increasingly complex, image forming systems or devices including printers, copiers, scanners, facsimile machines, and multi-function devices (MFDs) to which user work product may be directed as a print job in order that the work product is output as a result of an image forming operation in image forming system or device, particularly as some form of hard copy output document. These terms should not be considered as limiting to any particular configuration of the image forming devices, as described. In other words, the terms "image forming system" and "image forming device" are intended to be used interchangeably to refer globally to a class of devices and/or systems that carry out what are generally understood as printing and image forming functions as those functions would be familiar to those of skill in the art, including the use of devices and systems that may incorporate a plurality of individual image forming, fixing, finishing, and other components that may be separately linked together by one or more simple or complex image receiving media transport paths.

Figure 1:
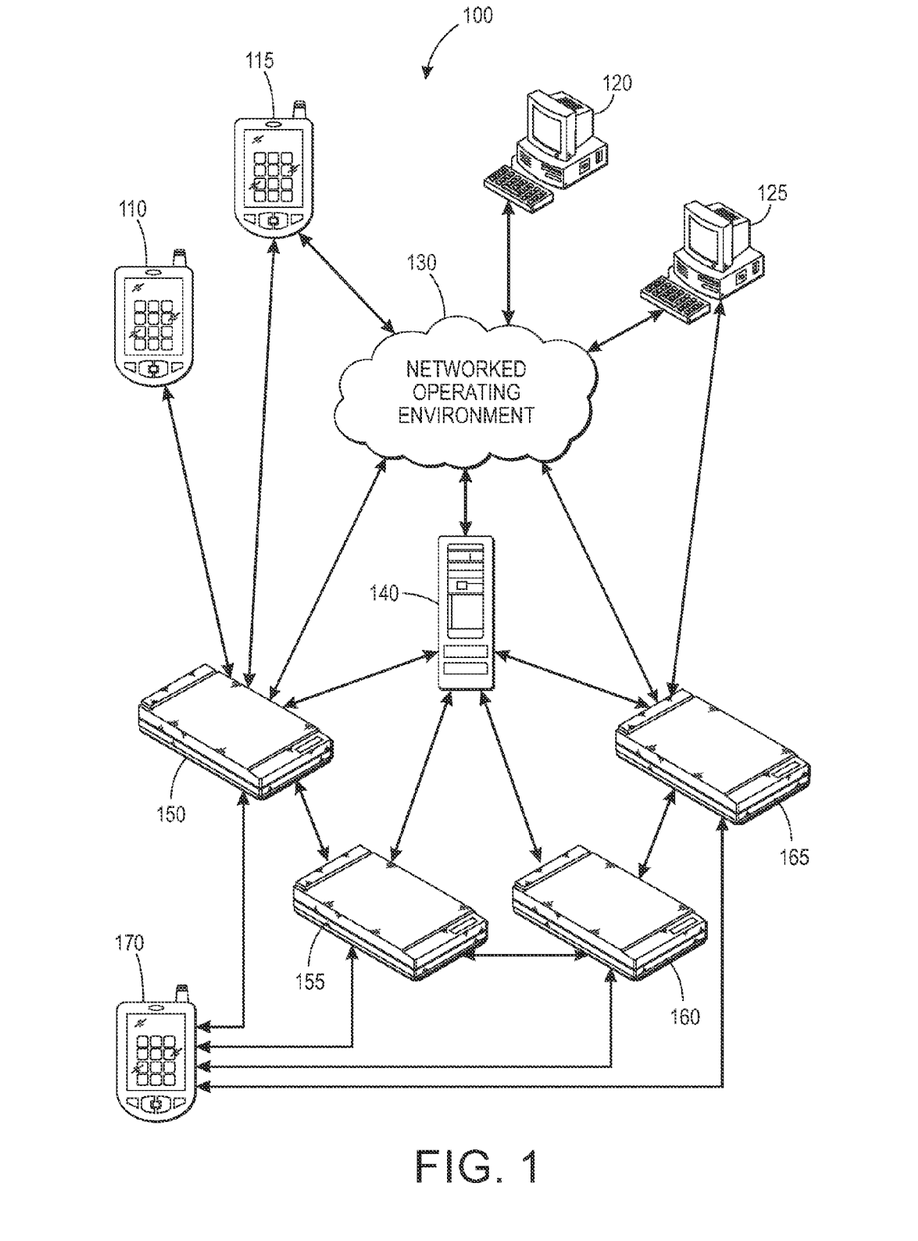
FIG. 1 illustrates a generic communication laydown scheme for a plurality of user workstations in direct and/or networked communication with one or more image forming devices that may benefit from a user mobile device print job transfer scheme using the systems and methods according to this disclosure.

FIG. 1 illustrates a generic communication laydown scheme 100 for a plurality of user workstations, and/or one or more mobile devices in direct and/or networked communication with one or more image forming devices that may benefit from a user mobile device print job transfer scheme using the systems and methods according to this disclosure. As shown in FIG. 1, a plurality of fixed user workstations 120,125, and a plurality of user mobile devices 110, 115 may be provided to facilitate user interaction with the network and ultimately with a plurality of output devices, including output image forming devices 150-165.

The plurality of fixed user workstations 120,125, and the plurality of user mobile devices 110, 115 may be configured to communicate with the plurality of output devices, including output image forming devices 150-165, by many different communication channels. These communication channels may include one or both of wired and wireless communication links. The communication channels may be direct communication links between one or more of the plurality of fixed user workstations 120,125, and the plurality of user mobile devices 110, 115 and the plurality of output devices, including output image forming devices 150-165. Otherwise, the communication channels may be via a series of individual communication links or sub-links, including via a networked operating environment 130, which may include one or more cloud-based communication components or links, and/or via one or more communication and/or data control and storage servers 140. These examples of typical or usable communication channels between the one or more of the plurality of fixed user workstations 120,125, and the plurality of user mobile devices 110, 115 and the plurality of output devices, including output image forming devices 150-165, are not intended to be, in any way limiting, to those communication channels.

A user mobile device 170 may be used to implement the print job transfer operations according to this disclosure. Otherwise, any involved mobile device, including the other depicted plurality of user mobile devices 110,115, with an appropriate print job transfer application, may be usable to effect the disclosed schemes.

Although depicted in FIG. 1 using identical symbols, it should be understood that either of the plurality of fixed user workstations 120,125, or the plurality of user mobile devices 110, 115, may be of many and widely varied different configurations. The different configurations, for example, for the plurality of user workstations 120,125 may include, but not be limited to, desk top computers or processor units of all types generally for wired (directly or via one or more networks) communications with output devices, such as output image forming devices 150-165. The plurality of user mobile devices 110,115 may include portable handheld devices, including cell phones, smartphones, tablets, laptops, notebooks, personal digital assistants (PDAs) and the like, and other comparable devices for wireless (directly or via one or more networks) communications with output devices, such as output image forming devices 150-165. No exclusivity to the categories of computing and communicating devices is implied.

Figure 2A:
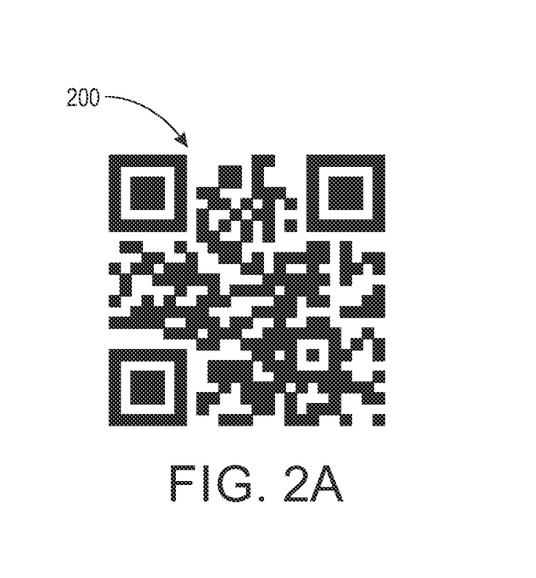
FIGS. 2A and 2B illustrate examples of mobile device visually-readable tags that may also, or exclusively, include wireless readable components that may be located on or in proximity to each of an involved original target image forming device and an alternate target image forming device for transfer of information regarding device identification and/or capabilities to the mobile device for implementing a print job transfer scheme according to this disclosure.
Figure 2B:
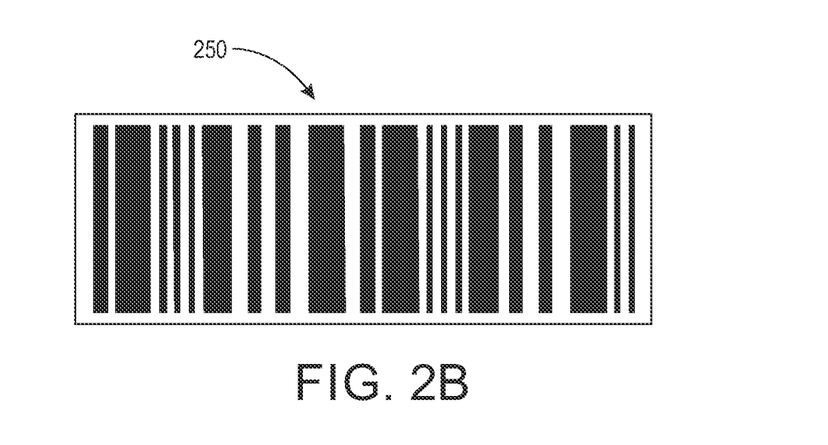

The disclosed embodiments operate within myriad networked computing and communicating environments such as is shown in exemplary manner in FIG. 1. The disclosed schemes are intended to employ a user's individual mobile device to provide direct, short-range communication with passive communication tags that may be visually or otherwise electronically read by the user's individual mobile device. FIGS. 2A and 2B illustrate examples of mobile device visually-readable tags. FIG. 2A illustrates a glyph-type visually-readable tag 200. FIG. 2B illustrates a bar-code-type visually-readable tag 250. In either instance, the visually-readable tag that may also include an electronic wirelessly-readable component including a near field communication (NFC) device, or a radio frequency identification device (RFID) embedded in the tag. In embodiments, the electronic wirelessly-readable component may be a stand-alone component, i.e., no visually-readable component may be provided in association with the "tag."

Regardless of the physical composition of the tag, i.e. visually-readable, electronically-readable, or a combination of the two, such tag may be located on or in proximity to each of an involved original target image forming device and an alternate target image forming device to identify each of the image forming devices and, according to the disclosed schemes, facilitate transfer of print information from the print queue of one device to the print queue of another device. Any protocol similar to NFC, which requires close physical proximity to communicate with a particular mobile device, may be usable to effect the disclosed print job transfer schemes. The tags may be "stick-on" passive tags, may be incorporated directly into an outer shell of a particular image forming system or device, or may be provided conveniently on a wall, a floor, or on a support unit in a vicinity of, and associated with, the particular image forming device that the tag is intended to identify. In embodiments, internal actively-supported (i.e., powered) tagging components ("hot spots"), incorporated directly in a particular image forming device itself, may be employed as well. These internal actively-supported tagging components may include, for example, Bluetooth-technology tags or other similar communicating technology tags involving close physical proximity and the notion of "touching" the tag, physically or through comparatively close proximity communication to avoid interference between individual tags associated with a plurality of image forming devices that may be substantially co-located.

In a first instance, a user may walk up to an intended target image forming device to retrieve the results of a print job that the user previously sent to the intended target image forming device. The user may determine that the results of the print job are not available to the user based on some failure in the intended target image forming device to produce the results of the print job. Encountering this difficulty, and not wishing to return to the user's workstation to redirect the print job to an alternate target image forming device, or in instances where such redirection may be precluded, a user may touch, or otherwise read, an identifying tag on the failed intended target image forming device, i.e., the source device in which the command print job is stuck job, using a user's mobile device running a print job transfer application according to this disclosure. The print job transfer application may authenticate the user through use of any one of a number of commonly-known authentication schemes in order to, for example, associate the user with a list of users authorized to command print jobs to the intended target image forming device. The print job transfer application may further read the tag and find particular attributes associated with the source device including, but not limited to, identification information for the source device, finishing options available in the source device, compatibility information regarding capabilities of the source device, or other like information. Such identifying attributes may be coded into the tag by the device manufacturer, the device supplier, or otherwise locally, according to provided procedures, by system administrative personnel within the user organization.

The print job transfer application may query a list of print jobs in a print queue of the source device when more than one print job is waiting in the queue, unable to be processed based on an extended period of time over which a failure of the source device was not recognized. The print job transfer application may then provide a user an opportunity to identify which particular print job or jobs the user may wish to manipulate. Otherwise, based on the user identifying information previously used for purposes of authentication, the print job transfer application may automatically filter the list of print jobs in the print queue of the source device and present to the user only those print jobs that are associated with the user that the user may wish to redirect to a different destination device. Regardless of the presence of any automated filtering scheme, the user may be afforded an option to select all print jobs, or otherwise one or more specific print jobs, from the displayed list.

The user then walks up to a different destination device and touches, or otherwise communicates with, its tag in turn, confirming when prompted to transfer jobs from the source device to the destination device. This transfer may be effected via direct communications between the source device and the destination device. The mobile device may read the information regarding device capabilities of the destination device from its tag. The print job transfer application on the mobile device may then instruct the source device with the stuck print job to transfer the print job to the destination device. The device model and configuration information read from the source device tag may be used by the print job transfer application as an input to a compatibility-matching subroutine, for example, to attempt to ensure that the destination device can execute the print job as the user intended. Such a capability may afford the user options for determining whether his or her commanded print job will be executed by the destination device in a manner intended by the user, or that may otherwise be acceptable to the user. In essence, such a capability may provide some safeguard for the user such that his or her time is not wasted by transferring the print job from the source device to an incompatible destination device. The user may be given options to execute the transfer understanding that some loss in unsupported printing and finishing options may occur when it may prove beneficial to the user to transfer the print job anyway to a less capable destination device.

A specific mechanism used to "logically" transfer a job from a selected source device to a selected destination device may be determined by the topology of the selected source device or selected destination device print queue. For example, the specific mechanism may need to determine how the source device may communicate with the destination device. As shown in FIG. 1, there may be one or more direct communication links between the source device and the destination device or there may be intervening components between the source device and the destination device including, for example, physical servers or cloud-based support applications. In more complex communications between the initiating user workstation, the source device and the destination device, the print job transfer application may need to determine where precisely the print job may currently reside in a processing chain. The "look" that the user gets should be consistent and therefore the specifics of the underlying mechanism may be transparent to the user. In embodiments, a preferred communication path may be directly from the source device to the destination device. This preferred communication may use either a push-type scheme in which the source device is commanded to transfer the print job to the destination device, or a pull-type scheme in which the destination device provides the commands to the source device to direct the transfer. In embodiments, the mobile device may provide the communication conduit by which the print job, substantially entirely, is transferred. In such an instance, the mobile device may pull the print job from the print queue of the source device and push the print job to the print queue of the destination device.

Regardless of the specific methodology, it is anticipated that once the user selects the destination device and the print job is logically transferred to the destination device, the print job will be removed from the source device in order that resources are not wasted by duplicative execution of the print job by the source device once the failure mode in the source device is cleared and the one or more print jobs remaining in the print queue of the source device may then be executed. Removal of the user's print job from the source device print queue may occur immediately upon transfer of the print job to the destination device or may be delayed, for example, until an indication, automatic or manual, is received from the destination device directly or via the mobile device that the print job has been completed by the destination device. In embodiments, separate notification may be provided back to the initiating user workstation, or otherwise to system administrators for tracking, regarding ultimate execution of a particular print job by other than an initially-directed image forming device terminating state and indicate in the job status that it has been redirected to the target device. Such a capability may be provided to enable ancillary features to the user or to the user organization including, but not limited to accounting, job tracking and the like.

The disclosed embodiments may provide faster and more convenient redirection of print jobs in image forming systems or devices using commonly available equipment such as mobile devices that are generally available to all users. The mobile devices may be programmed with print job transfer applications, and compatible communication tags to facilitate the disclosed schemes. As an example, NFC tags costing in a range of $1.00-$2.00 are available now, and the cost of these tags is expected to decrease over time, particularly through the expanded proliferation of their use. It is a precise advantage of the disclosed schemes that the print job redirection from a failed source device to a destination device is at the will of the user. The user can walk up to the individual image forming devices of his or her choosing and read, with the user's mobile device visually- and/or electronically-readable tags on the failed source device and a first-selected, or subsequently selected, destination device in order to initiate print job transfer process, all under the user's control, according to the disclosed embodiments.

A user's individual possession and use of a mobile device that is programmed with a print job transfer application may establish a step of customizing a user login and authentication procedure. In embodiments, a particular user may select his or her own preferred alternate image forming device to streamline the process by which to redirect a particular print job from a failed selected target image forming device. With such a pre-programmed user selection, a number of steps that may require some level of user interaction with the user's mobile device may be bypassed, or otherwise avoided. In embodiments, a significant amount of what may be considered "standardized" information regarding a particular user may be captured by the print-job transfer application resident in the user's mobile device in a manner that the details of a device-to-device transfer of print job information in the print queue of a particular image forming device may be transferred by merely by touching the tag of the particular image forming device in which the print job information resides.

An advantage of the disclosed schemes is that the destination device to which the print job is redirected may not need to be pre-configured with particular print system specifics. Instead, the particular print job may be redirected to the destination device as a package as chosen by the user in a simple and direct manner.

Figure 3:
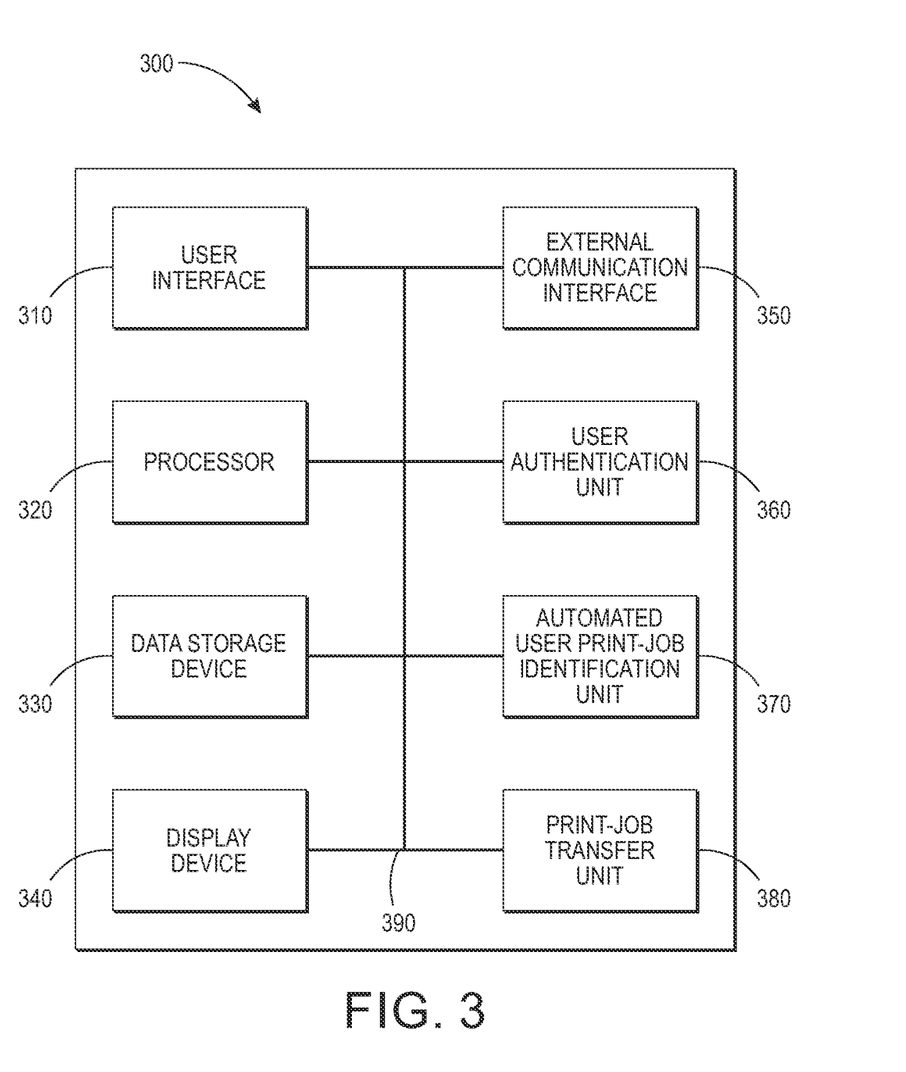
FIG. 3 illustrates a block diagram of an exemplary system that may be resident in a user mobile device for effecting a user-interactive scheme for transfer of a print job from the print queue of an original target image forming device to the print queue of an alternate target image forming device according to this disclosure.

FIG. 3 illustrates a block diagram of an exemplary system 300 that may be resident in a user mobile device for effecting a user-interactive scheme for transfer of a print job from the print queue of a selected original target image forming device to the print queue of an alternate target image forming device according to this disclosure.

The exemplary system 300 may include a user interface 310 by which a user may communicate with the exemplary system 300. The user interface 310 may be configured as one or more conventional mechanisms that permit a user to input information to the exemplary system 300. The user interface 310 may include, for example, an integral or attached keyboard or a touchscreen with "soft" buttons for communicating commands and information to the exemplary system 300. The user interface 310 may alternatively include a microphone by which a user may provide oral commands to the exemplary system 300 to be "translated" by a voice recognition program or otherwise. The user interface 310 may otherwise include any other like device for user operation of, and data exchange with, the exemplary system 300. A user may make inputs via the user interface 310 to initiate and manage an application to effect transfer of a print job directing a print job transfer image forming operation in a selected original target image forming device to an alternate target image forming device using a mobile device that houses the exemplary system 300 according to the disclosed schemes.

The exemplary system 300 may include one or more local processors 320 for individually undertaking the processing and control functions that are carried out by the exemplary system 300. Processor(s) 320 may include at least one conventional processor or microprocessor that interprets and executes instructions, and that processes outgoing and incoming data via different communication links that the exemplary system 300 may use to communicate directly, or via a network environment, with a selected original target image forming device and alternate target image forming device, principally by reading one or more visually- or electronically-readable tags associated with the selected original target image forming device and/or the alternate target image forming device. Such communication may be facilitated via one or more external communication interfaces 350 in the exemplary system 300 that are specifically configured to visually, or otherwise electronically, read the tags. The external communication interface(s) 350 may comprise particular communication connections that may be appropriately configured to assist the exemplary system 300 in collecting information from the tags associated with the selected original target image forming device and the alternate target image forming device in support of managing the print job transfer application according to this disclosure. No particular configuration to the external communication interface(s) 350 is intended to be implied that may limit a function of the external communication interface(s) 350.

The exemplary system 300 may include one or more data storage devices 330. Such data storage device(s) 330 may be used to store data, and operating programs, including a print job transfer application to be used by the exemplary system 300, and specifically the processor(s) 320, to carry into effect the print job transfer scheme according to this disclosure. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for execution by the processor(s) 320. The data storage device(s) 330 will generally be those that are integral to the exemplary system 300. Otherwise, the data storage device(s) 330 may include a remote data storage device external to the exemplary system 300 that is in wireless communication with the exemplary system 300.

The exemplary system 300 may include at least one display device 340 that may be configured as one or more conventional mechanisms that display information to a user of a system such as the exemplary system 300 for operation of the exemplary system 300 in its various operating modes. The at least one display device 340 may be used for displaying, for example, a list of pending, but unexecuted, print jobs from the print queue of the selected original target image forming device. The displayed list of pending, but unexecuted, print jobs may be filtered to include only such print jobs as the print job transfer application may confirm are particularly associated with the user of the mobile device housing the exemplary system 300. Information regarding image data and/or printing instructions provided to the selected original target image forming device may be displayed on the display device 340 in order that the user of the mobile device within which the exemplary system 300 is located may provide user input to direct a print job transfer from the selected original target image forming device to an alternate target image forming device in the manner described in this disclosure. When the exemplary system 300 determines a level of compatibility of the alternate target image forming device to facilitate execution of the commanded print job, one or more options for further action for the user to direct may be displayed on the display device 340. The user may select one or more of the displayed options through manual manipulation of the user interface 310 in order to provide user-directed inputs to the exemplary system 300.

The exemplary system 300 may include a user authentication unit 360 by which the exemplary system 300 may execute a scheme for authenticating a user, and a user's access, to a listing of print jobs resident in a print queue of a selected original target image forming device. The user authentication unit 360 may facilitate access by the user to the selected original target image forming device as a source device and the alternate target image forming device as a destination device in order that the user, through manipulation of the mobile device, may direct transfer of the print job.

The exemplary system 300 may include an automated user print job identification unit 370. The automated user print job identification unit 370 may operate as a stand-alone component of the exemplary system 300, or otherwise may constitute a function of the one or more processors 320 in communication with one or more data storage devices 330. The automated user print job identification unit 370 may be used to query the selected original target image forming device to determine a list of pending and unexecuted print jobs residing in the print queue of the selected original target image forming device. The automated user print job identification unit 370 may simply download that list of pending and unexecuted print jobs, or it may apply one or more filters by which to associate a subset of the pending and unexecuted print jobs with the user of the mobile device. In either instance, the automated user print job identification unit 370 may provide input to the display device 340 to display the recovered list for use by the user.

The exemplary system 300 may include a print job transfer unit 380. As with the automated user print job identification unit 370, the print job transfer unit 380 may operate as to stand-alone component of the exemplary system 300, or otherwise may constitute a function of the one or more processors 320 in communication with one or more data storage devices 330. The print job transfer unit 380 may constitute the mechanism by which the exemplary system 300 housed in the mobile device manipulated by the user may command the selected original target image forming device to transfer one or more of the pending and unexecuted print jobs from its print queue to a print queue of an alternate target image forming device as selected by the user. In an alternative embodiment, the print job transfer unit 380 may command download of the print job to the mobile device and then direct further transfer of the print job in its entirety from the mobile device to the alternate target image forming device. The print job transfer unit 380 may monitor completion of the print job transfer, or otherwise may receive feedback from the alternate target image forming device that the transferred print job has been executed. In either case, the print job transfer unit 380 may generate a signal to be sent to the selected original target image forming device to purge the transferred print job from the print queue of the selected original target image forming device.

All of the various components of the exemplary system 300, as depicted in FIG. 3, may be connected by one or more data/control busses 390. The data/control busses 390 may provide internal wired or wireless communication between the various components of the exemplary system 300, as all of those components are housed integrally in a single mobile device, or as certain of the elements may be remotely housed and be in wireless communication with other components of the exemplary system 300.

It is anticipated that the various disclosed elements of the exemplary system 300 may be arranged in combinations of sub-systems as individual components or combinations of components, but that, regardless of the specific configuration, all of the depicted components may be integral to a single unit that is the exemplary system 300 housed in a mobile device. In embodiments, individual components, or combinations of components, may be remotely dispersed in multiple locations and in wireless communication with the mobile device and with other of the individual components of the exemplary system 300 that may communicate with those components. In other words, no specific configuration as an integral unit or as a support unit for the exemplary system 300 is to be implied by the depiction in FIG. 3.

Further, although depicted as separate individual elements for clarity and ease of understanding, it should be understood that the individually-described functions of the depicted elements may be carried out by one or more processors 320 in the exemplary system 300.

Figure 4:
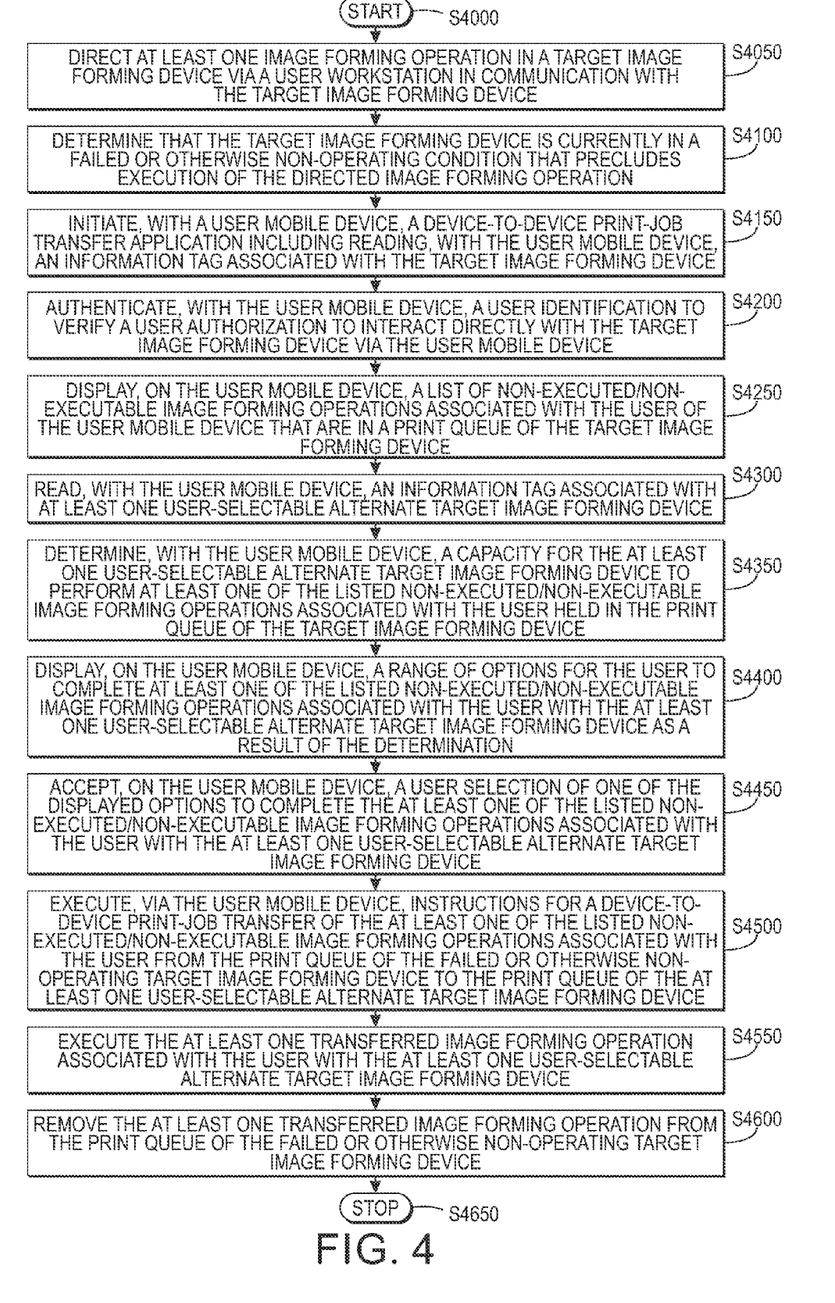
FIG. 4 illustrates a flowchart of an exemplary method for effecting a user-interactive scheme for transfer of a print job from the print queue of an original target image forming device to the print queue of an alternate target image forming device according to this disclosure.

The disclosed embodiments may include an exemplary method for effecting a user-interactive scheme for transfer of a print job from the print queue of a selected original target image forming device to the print queue of an alternate target image forming device according to this disclosure. FIG. 4 illustrates a flowchart of such an exemplary method. As shown in FIG. 4, operation of the method commences at Step S4000 and proceeds to Step S4050.

In Step S4050, an image forming operation may be directed to be executed in a selected original target image forming device. The direction of the image forming operation may be undertaken via a user workstation in communication with the selected original target image forming device. Operation of the method proceeds to Step S4100.

In Step S4100, a determination may be made that the selected original target image forming device is currently in a failed or otherwise non-operating condition that precludes execution of the directed image forming operation. Operation of the method proceeds to Step S4150.

In Step S4150, a user mobile device may be employed to initiate a device-to-device print-job transfer application by reading, with the user mobile device, an information tag associated with the selected original target image forming device. The information tag may be a visually-readable tag that may be read by using a camera-like unit in the mobile device. The information tag may additionally, or alternatively, constitute some form of an electronically-readable tag including, for example, a near field communication (NFC) device or radio frequency identification device (RFID) that may be queried by the mobile device. The information tag may be placed on or in a vicinity of the selected original target image forming device and may include information identifying the selected original target image forming device, and additional information identifying, for example, image forming capabilities of the selected original target image forming device. Operation of the method proceeds to Step S4200.

In Step S4200, an authentication scheme may be initiated with the user mobile device to identify the user and/or to verify that the user is authorized to interact directly with the selected original target image forming device via the user mobile device. Operation of the method proceeds to Step S4250.

In Step S4250, a list of non-executed/non-executable image forming operations resident in the print queue of the selected original target image forming device may be accessed and displayed on a display component of the user mobile device. The displayed list of non-executed/non-executable image forming operations may include all of the pending print jobs in the print queue of the selected original target image forming device, or may be filtered to include only those print jobs that can be associated with the user of the user mobile device. Operation of the method proceeds to Step S4300.

In Step S4300, in furtherance of the user-direct print job transfer application undertaken by the user mobile device, the user mobile device may read an information tag associated with at least one user-selectable alternate target image forming device to which the user may desire that at least one non-executed/non-executable image forming operation may be transferred from the selected original target image forming device. The information tag associated with the at least one user-selectable alternate target image forming device may include the same features as described above for the selected original target image forming device. Operation of the method proceeds to Step S4350.

In Step S4350, the user mobile device may be employed to determine, via information provided by the information tag associated with the at least one user-selectable alternate target image forming device, whether the at least one user-selectable alternate target image forming device has the capacity, or capability, to perform at least one of the listed non-executed/non-executable image forming operations associated with the user held in the print queue of the selected original target image forming device. Operation of the method proceeds to Step S4400.

In Step S4400, based on the determination, a range of options for the user may be presented on a display unit of the user mobile device. These options may include a list of actions that the user may choose to take regarding transfer of at least one of the listed non-executed/non-executable image forming operations associated with the user to the at least one user-selectable alternate target image forming device. In instances where the at least one user-selectable alternate target image forming device is determined to be compatible in substantially all respects with the selected original target image forming device, the range of options may be as simple as requesting authorization from the user to transfer the image forming operation from the print queue of the selected original target image forming device to the print queue of the at least one user-selectable alternate target image forming device. Conversely, in instances where the at least one user-selectable alternate target image forming device is determined to be not compatible in substantially all respects with the selected original target information device, the range of options may advise the user regarding what, if any, output document deviations or degradations may result from the user selecting to transfer the print job to the at least one user-selectable alternate target image forming device. Operation of the method proceeds to Step S4450.

In Step S4450, the user selection of one of the displayed options to complete the at least one of the listed non-executed/non-executable image forming operations associated with the user with the at least one user-selectable alternate target image forming device may be received by the user mobile device including, for example, through user implementation of a user interface. Operation of the method proceeds to Step S4500.

In Step S4500, the user mobile device may execute instructions for a device-to-device print job transfer of the at least one of the listed non-executed/non-executable image forming operations associated with the user from the print queue of the failed or otherwise non-operating selected original target image forming device to the print queue of the at least one user-selectable alternate target image forming device. An advantage of this scheme is that the user of the user mobile device retains full, current, and close control of the device-to-device print job transfer operation between the selected original target image forming device and the at least one user-selectable alternate target image forming device. Operation of the method proceeds to Step S4550.

In Step S4550, the at least one transferred image forming operation associated with the user may be executed by the at least one user-selectable alternate target image forming device. Operation of the method proceeds to Step S4600.

In Step S4600, at least one transferred image forming operation may be removed, or otherwise deleted, from the print queue of the failed or otherwise non-operating selected original target image forming device in order that the image forming operation is not redundantly undertaken when the failed or otherwise non-operating condition is cleared in the selected original target image forming device. Operation of the method proceeds to Step S4650, where operation of the method ceases.

The above-described exemplary systems and methods reference certain conventional components to provide a brief, general description of suitable user workstations, mobile devices and image forming systems or devices that may be combined in a networked communication environment. These combinations of exemplary devices may be particularly adaptable to executing the print job transfer schemes according to this disclosure. Those skilled in the art will appreciate that other embodiments of the disclosed subject matter may be practiced with many types of output image forming systems or devices and many types of fixed or mobile computing and communicating components, and in networked environments in many different configurations.

Although not required, elements of the disclosed schemes may be implemented using hardware components, software elements, firmware, and combinations thereof, in image forming systems or devices, mobile communicating and computing devices, and others of the described components.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where a particular method step is a necessary precondition to execution of any other method step. Individual method steps may be carried out in sequence, or in parallel, in simultaneous or near simultaneous timing.

Although the above description may contain specific details, they should not be construed as limiting the claims in any way. Other configurations of the described embodiments of the disclosed systems and methods are part of the scope of this disclosure.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for directing image forming operations in an image forming devices, comprising:
   receiving, in a first image forming device, a signal from an image source directing completion of an image forming operation in the first image forming device;
   determining that the first image forming device is in a stuck condition that precludes completion of the image forming operation in the first image forming device;
   reading, with at least one of a communicating device and a computing device only when the at least one of the communicating device and the computing device is in a physical proximity of the first image forming device, identifying information for the first image forming device only upon receiving the signal directing completion of the image forming operation in the first image forming device and determining that the first image forming device is in the stuck condition;
   reading, with the at least one of the communicating device and the computing device only when the at least one of the communicating device and the computing device is in a physical proximity of the second image forming device, identifying information for a second image forming device only upon receiving the signal directing completion of the image forming operation in the first image forming device and determining that the first image forming device is in the stuck condition;
   directing, only upon the at least one of the communicating device and the computing device being in a physical proximity of at least one of the first image forming device and the second image forming device, transfer of the image forming operation from the first image forming device to the second image forming device for completion; and
   completing the image forming operation in the second image forming device.

2. The method of claim 1, the identifying information for at least one of the first image forming device and the second image forming device being provided via a hotspot, the hotspot being a powered near field communication device located within the at least one of the first image forming device and the second image forming device.

3. The method of claim 1, the identifying information for at least one of the first image forming device and the second image forming device being provided on a tag, the tag being one of (1) a machine-readable electronic tag comprising at least one of a near field communication device and a radio frequency identification device, and (2) a machine-readable visual tag printed with at least one of a barcode and a glyph.

4. The method of claim 1, further comprising:
   displaying, on a display portion of the at least one of the communicating device and computing device, a list of image forming operations pending in a print queue for the first image forming device; and
   accepting a user input selecting one or more of the displayed image forming operations from the list as the image forming operation to be transferred to and completed by the second image forming device.

5. The method of claim 4, further comprising removing the transferred image forming operation from the list of image forming operations pending in the print queue for the first image forming device.

6. The method of claim 1, further comprising:
   authenticating, with the at least one of the communicating device and the computing device, an identity of a user of the at least one of the communicating device and the computing device; and
   determining an authority of the user to interact with the first image forming device via the at least one of the communicating device and the computing device.

7. The method of claim 6, further comprising:
   filtering, with the at least one of the communicating device and the computing device, a list of image forming operations pending in a print queue for the first image forming device to determine the image forming operations that are associated with the user;
   displaying, on a display portion of the at least one of the communicating device and the computing device, a list of the image forming operations associated with the user; and
   accepting a user input selecting one or more of the displayed image forming operations from the list as the image forming operation to be transferred to and completed by the second image forming device.

8. The method of claim 1, the identifying information for at least one of the first image forming device and the second image forming device including capabilities information for the at least one of the first image forming device and the second image forming device.

9. The method of claim 8, further comprising determining, with the at least one of the communicating device and the computing device, whether the second image forming device has a capability to complete the image forming operation as directed.

10. The method of claim 9, further comprising, displaying on a display portion of the at least one of the communicating and the computing device, an indication regarding how an output image completed by the second image forming device is degraded when completed by the second image forming device when it is determined that the second image forming device does not have the capability to complete the image forming operation as directed.

11. The method of claim 9, further comprising displaying, on a display portion of the at least one of the communicating device and the computing device, a plurality of options for transfer and completion of the image forming operation when it is determined that the second image forming device does not have the capability to complete the image forming operation as directed.

12. The method of claim 11, the plurality of options including confirming completion of the image forming operation by the second image forming device.

13. The method of claim 12, the plurality of options including:
   reading, with the at least one of the communicating device and the computing device, identifying information for a third image forming device in a physical proximity of the third image forming device;
   directing, with the at least one of the communicating device and the computing device in a physical proximity of at least one of the first image forming device and the third image forming device, transfer of the image forming operation from the first image forming device to the third image forming device for completion; and
   completing the image forming operation in the third image forming device.

14. The method of claim 1, the directing, with the at least one of the communicating device and the computing device, transfer of the image forming operation from the first image forming device to the second image forming device for completion comprising:
   downloading the image forming operation from the first image forming device to the at least one of the communicating device and the computing device; and
   uploading the image forming operation from the at least one of the communicating device and the computing device to the second image forming device.

15. A communicating device for directing image forming operations in image forming devices, comprising:
   a user interface that accepts user inputs directing completion of an image forming operation by a first image forming device;
   a processor configured to determine that the first image forming device is in a stuck condition that precludes completion of the image forming operation in the first image forming device;
   the communicating device configured for reading identifying information for the first image forming device in a physical proximity of the first image forming device and for a second image forming device in a physical proximity of the second image forming device only upon the user interface accepting the signal directing completion of the image forming operation in the first image forming device and determining that the first image forming device is in the stuck condition;
   the processor being programmed with a print-job transfer application to direct transfer of an image forming operation from the first image forming device to the second image forming device for completion in response to a user input only when in a physical proximity of at least one of the first image forming device and the second image forming device; and
   a display portion that displays information on image forming operations eligible to be transferred from the first image forming device to the second image forming device.

16. The communicating device of claim 15, the communicating device being configured to read identifying information for the at least one of the first image forming device and the second image forming device from a hotspot, the hotspot being a powered near field communication device located within the at least one of the first image forming device and the second image forming device.

17. The communicating device of claim 15, the communicating device being configured to read identifying information for the at least one of the first image forming device and the second image forming device from one of (1) a machine-readable electronic tag comprising at least one of a near field communication device and a radio frequency identification device, and (2) a machine-readable visual tag printed with at least one of a barcode and a glyph.

18. The communicating device of claim 15, the display portion displaying a list of image forming operations pending in a print queue for the first image forming device, and the user interface accepting a user input selecting one or more of the displayed image forming operations from the list as the image forming operation to be transferred to and completed by the second image forming device.

19. The communicating device of claim 18, the processor being further programmed to direct removal of the transferred image forming operation from the list of image forming operations pending in the print queue for the first image forming device.

20. The communicating device of claim 15, further comprising a user authenticating device that authenticates an identity of the user of the communicating device, and determines an authority of the user to interact with the first image forming device via the communicating device.

21. The communicating device of claim 20, the user authenticating device filtering a list of image forming operations pending in a print queue for the first image forming device to determine the image forming operations that are associated with the user, the display portion displaying a list of the image forming operations associated with the user, and the user interface accepting a user input selecting one or more of the displayed image forming operations from the list as the image forming operation to be transferred to and completed by the second image forming device.

22. The communicating device of claim 15, the communicating device reading capabilities information for the second image forming device in a physical proximity of the second image forming device,
   the processor being further programmed to
      determine whether the second image forming device has a capability to complete the image forming operation as directed,
      direct display on the display portion of an indication regarding how an output image completed by the second image forming device is degraded when completed by the second image forming device when it is determined that the second image forming device does not have the capability to complete the image forming operation as directed, and
      direct display on the display portion of a plurality of options for transfer and completion of the image forming operation when it is determined that the second image forming device does not have the capability to complete the image forming operation as directed, the plurality of options including at least one of (1) confirming completion of the image forming operation by the second image forming device, and (2) directing reading with the communicating device of identifying information for a third image forming device in a physical proximity of the third image forming device and directing transfer of the image forming operation from the first image forming device to the third image forming device.

23. The communicating device of claim 15, the processor being further programmed to download the image forming operation from the first image forming device to the communicating device, and upload the image forming operation from the communicating device to the second image forming device.

24. A non-transitory computer-readable medium storing instructions which, when executed by a processor in at least one of a communicating device and a computing device, cause the processor to execute a method for directing image forming operations in image forming devices, comprising:

determining that a first image forming device is in a stuck condition that precludes completion of a received image forming operation;

reading, only when the at least one of the communicating device and the computing device is in a physical proximity of the first image forming device, identifying information for the first image forming device only upon receiving the signal directing completion of the image forming operation in the first image forming device and determining that the first image forming device is in the stuck condition;

reading, only when the at least one of the communicating device and the computing device is in a physical proximity of the second image forming device, identifying information for a second image forming device only upon receiving the signal directing completion of the image forming operation in the first image forming device and determining that the first image forming device is in the stuck condition;

directing, only upon the processor being in a physical proximity of at least one of the first image forming device and the second image forming device, transfer of the received image forming operation from the first image forming device to the second image forming device for completion; and     completing the at least one image forming operation in the second image forming device.

\* \* \* \* \*